(12) United States Patent
Watanabe et al.

(10) Patent No.: US 6,769,388 B2
(45) Date of Patent: Aug. 3, 2004

(54) INTERNAL COMBUSTION ENGINE INTAKE CONTROL APPARATUS AND METHODS

(75) Inventors: Takashi Watanabe, Susono (JP); Hiroki Ichinose, Fujinomiya (JP); Yuuichi Katou, Susono (JP); Kazuhiro Wakao, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 143 days.

(21) Appl. No.: 10/093,617

(22) Filed: Mar. 11, 2002

(65) Prior Publication Data

US 2002/0134340 A1 Sep. 26, 2002

(30) Foreign Application Priority Data

Mar. 26, 2001 (JP) ........................................ 2001-088422

(51) Int. Cl.[7] ......................... F02M 03/07; F02N 17/00
(52) U.S. Cl. .................................................. 123/179.18
(58) Field of Search ............................... 123/330, 336, 123/339.16–339.18, 179.18

(56) References Cited

U.S. PATENT DOCUMENTS

| 5,267,543 A | * | 12/1993 | Novak et al. ................ 123/306 |
| 5,522,360 A | * | 6/1996 | Suzuki et al. ................ 123/329 |
| 5,542,388 A | * | 8/1996 | Ichinose et al. ............. 123/336 |

FOREIGN PATENT DOCUMENTS

| JP | A 04-164140 | 6/1992 | |
| JP | A 4-191433 | 7/1992 | |
| JP | A 07-224692 | 8/1995 | |
| JP | A 09-264148 | 10/1997 | |
| JP | 2000205029 A | * 7/2000 | ........... F02D/45/00 |
| JP | A 2000-303847 | 10/2000 | |

* cited by examiner

*Primary Examiner*—Mahmoud Gimie
*Assistant Examiner*—Arnold Castro
(74) *Attorney, Agent, or Firm*—Oliff & Berridge PLC

(57) ABSTRACT

An intake control apparatus and methods that include an intake control valve disposed in an intake pipe of an internal combustion engine downstream of a throttle valve. From the start-up to the warm-up of the engine, the opening and closing of the intake control valve can be controlled based on the stability of combustion in the engine.

7 Claims, 15 Drawing Sheets

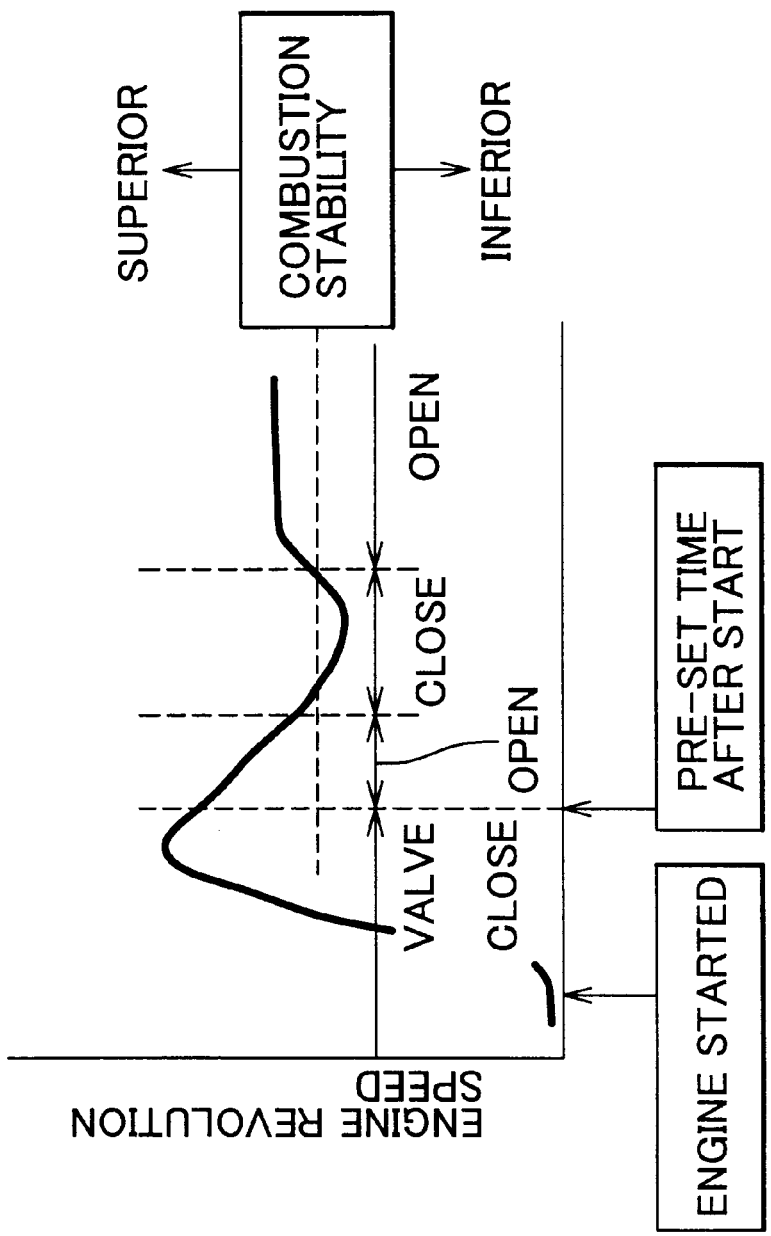

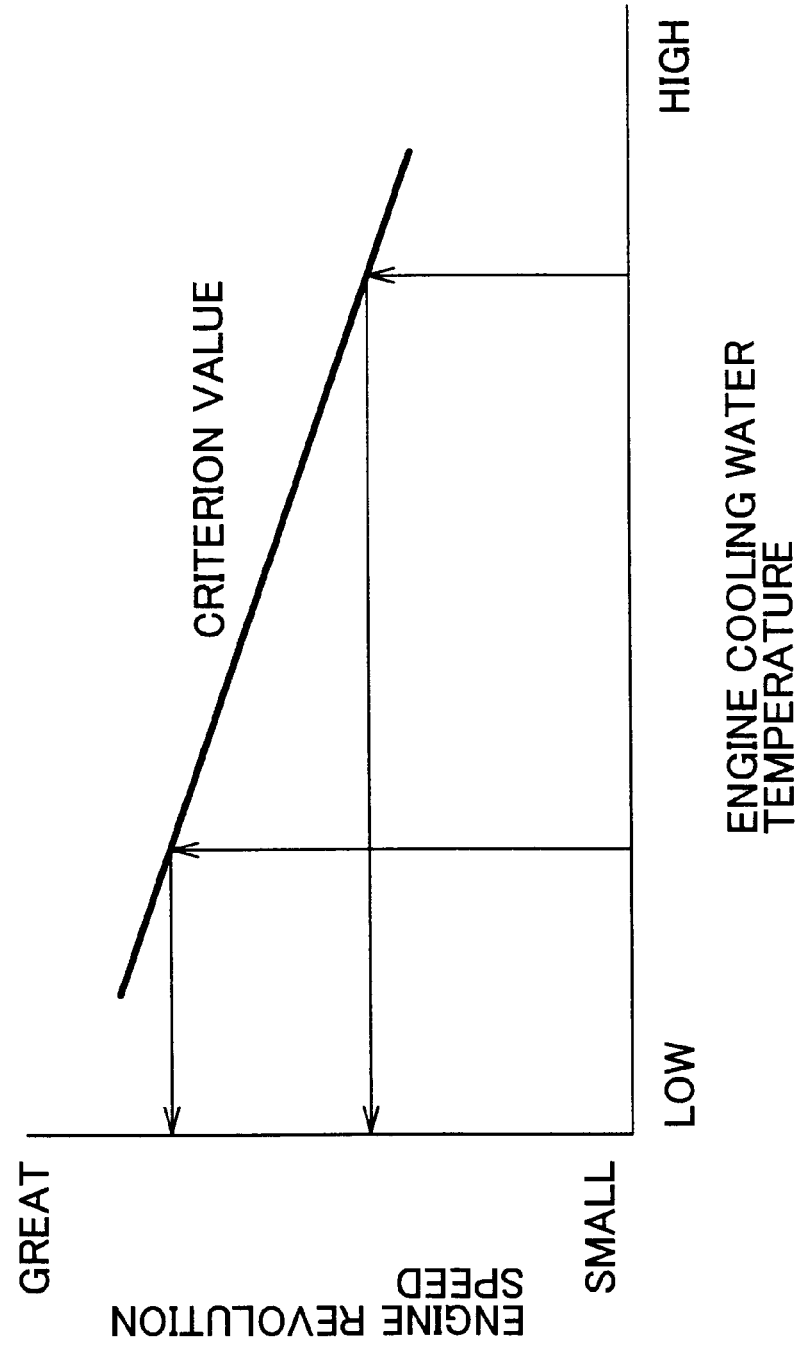

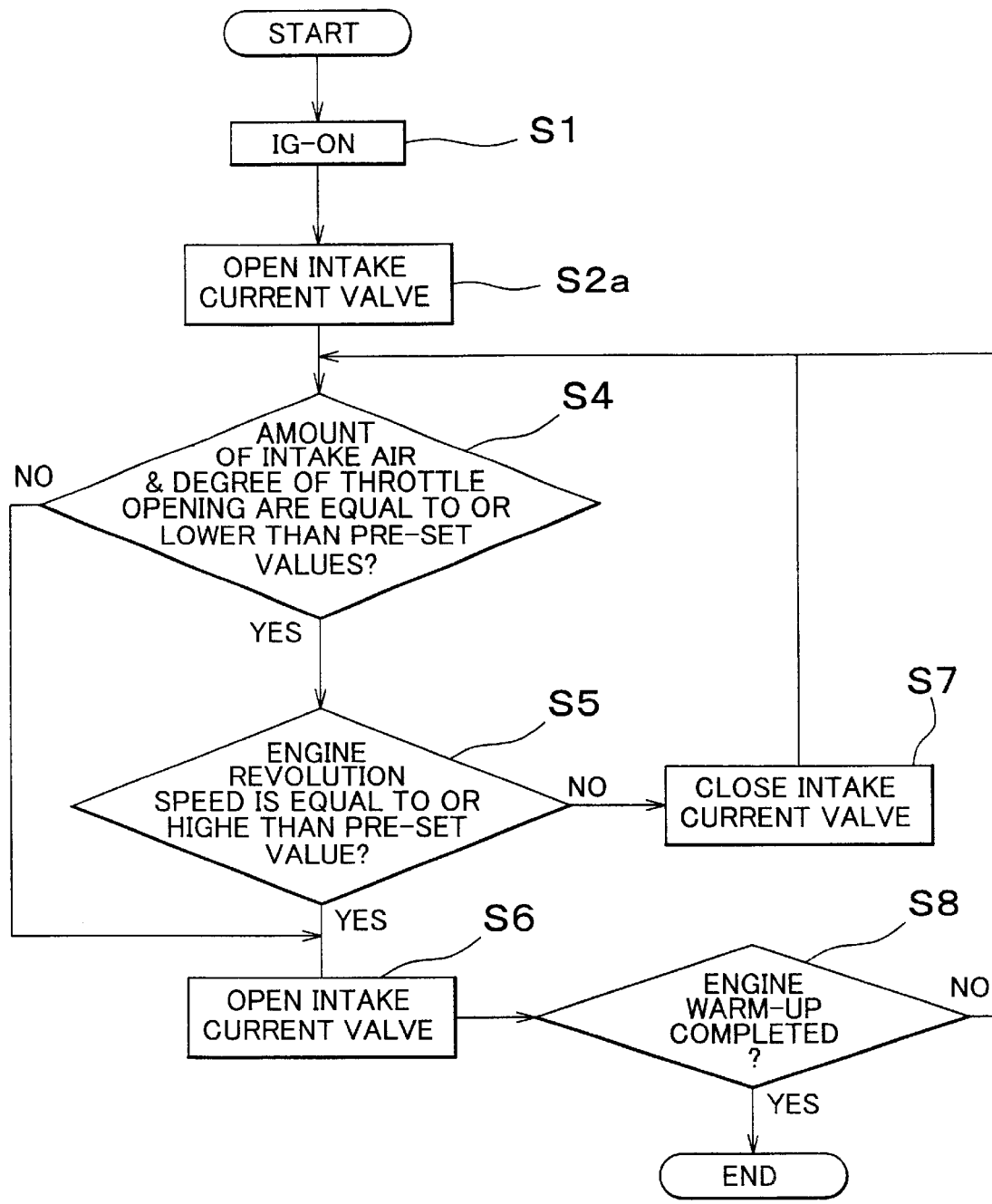

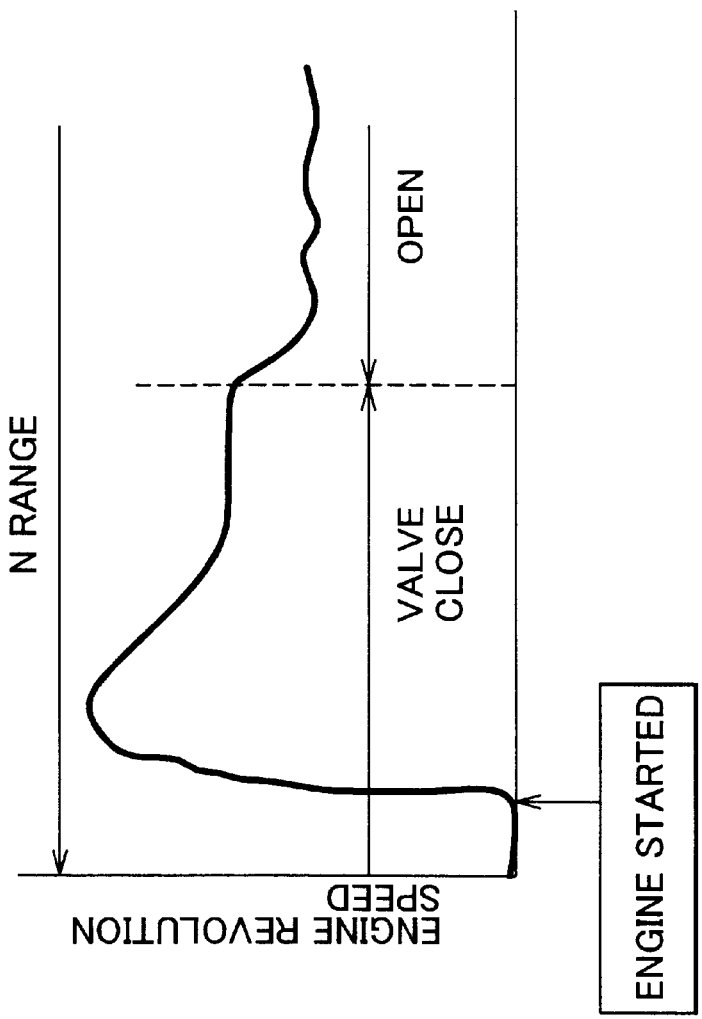

INTERNAL COMBUSTION ENGINE INTAKE CONTROL APPARATUS AND METHODS

INCORPORATION BY REFERENCE

The disclosure of Japanese Patent Application No. 2001-88422 filed on Mar. 26, 2001 including the specification, drawings and abstract is incorporated herein by reference in its entirety.

BACKGROUND OF THE INVENTION

1. Field of Invention

The invention relates to an intake control apparatus and methods of an internal combustion engine that has an intake control valve in an intake pipe downstream of a throttle valve.

2. Description of Related Art

In a known technology, smaller particles of injected fuel during startup of an engine are formed to achieve a stable combustion by controlling the air current in an intake pipe. The air current is controlled through the use of an intake control valve disposed in the intake pipe and downstream of a throttle valve. Furthermore, by forming turbulences in the air current in cylinders of the engine, lean combustion is made possible which improves the exhaust emission quality.

An example of the aforementioned technology is described in Japanese Patent Application Laid-Open No. 4-191433. This patent application describes a process for detecting and determining a combustion property based on the combustion in an engine. The technology improves combustion by restricting the closing action of the intake control valve, until a property of fuel has been detected and determined. Furthermore, the detection and determination of the property of fuel is performed with high precision, thus ensuring good vehicle running performance.

However, if deterioration of the combustion occurs, for example, the property of fuel is inferior, then restriction of the closing action of the intake control valve can occur, which results in a reduction or elimination of the combustion performance improving effect. Accordingly, this reduction or elimination can degrade the state of the operation of the engine, thus discomforting an occupant in the vehicle. Furthermore, when the restriction of the closing action of the intake control valve is prevented, or when an opening action of the valve is caused, the state of the combustion in the engine changes which can cause produced torque to fluctuate depending on conditions, and therefore an occupant may be discomforted.

SUMMARY OF THE INVENTION

Accordingly, it is an object of the invention to provide an intake control apparatus and methods of an internal combustion engine that reduce the discomfort caused to a vehicle occupant by the changes in the combustion in the engine, even during the opening and closing actions of an intake control valve.

In accordance with a first aspect of the invention, an intake control apparatus of an internal combustion engine includes an intake control valve disposed in an intake pipe downstream of a throttle valve. The control apparatus and methods control an opening and closing of the intake control valve based on a stability of the combustion in the internal combustion engine during a period from a start-up to a warm-up of the internal combustion engine.

Therefore, by controlling the intake control valve based on the stability of the combustion, deterioration in the operation of the engine can be reduced or prevented, thus also reducing the discomfort caused to a vehicle occupant.

In accordance with a second aspect of the invention, an intake control apparatus and methods of an internal combustion engine includes an intake control valve disposed in an intake pipe downstream of a throttle valve. The control apparatus and methods change an open-closed state of the intake control valve during a period from a start-up to a warm-up of the internal combustion engine, and determine a property of a fuel based on a change in the operation of the internal combustion engine that is caused by the changing of the open-closed state of the intake control valve.

Since the state of the combustion can be changed by the open-close control of the intake control valve, it becomes possible to determine the property of the fuel with high precision by actively performing the open-close control to intentionally change the combustion, and by measuring changes in the operation of the engine that occur in association with the changes in the combustion.

In accordance with a third aspect of the invention, an intake control apparatus and methods of an internal combustion engine include an intake control valve disposed in an intake pipe downstream of a throttle valve. The control apparatus and methods control an opening and closing of the intake control valve synchronously with a change in a load on the internal combustion engine.

Therefore, if the open-close control of the intake control valve changes the combustion so that the state of output of the internal combustion engine fluctuates, such fluctuations are absorbed or offset by fluctuations in the load. Since fluctuations in the load can be anticipated by vehicle occupants, fluctuations in the load will not considerably dismay or discomfort vehicle occupants.

In accordance with a fourth aspect of the invention, an intake control apparatus and methods of an internal combustion engine includes an intake control valve disposed in an intake pipe downstream of a throttle valve. The control apparatus and methods control the intake control valve to close the intake control valve upon determining that the property of the fuel being used is inferior.

Therefore, if it is determined that the property of the fuel is inferior, that is, if it is determined that the property of the fuel will prevent a certain stability of combustion from being maintained if the intake control valve is opened, the intake control valve is maintained closed in order to improve combustion, and maintain a predetermined stability of combustion.

The invention is not limited to the intake control apparatuses and methods of the first to fourth aspects, but is also applicable to vehicles equipped with an intake control apparatus as described above, and to a control method thereof.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3B is a diagram showing time-dependent changes in engine revolution speed caused by using low-quality fuel with the control process of FIG. 2;

FIG. 4 is a graph showing a relationship between a combustion stability criterion value used in the control process of FIG. 2 and engine cooling water temperature;

FIG. 5 is a flowchart illustrating a second exemplary process of controlling the intake control apparatus;

FIG. 13A is a diagram showing changes in engine revolution speed that occur due to controlling an opening and closing of the intake control valve.

DETAILED DESCRIPTION OF PREFERRED EMBODIMENTS

Figure 1:
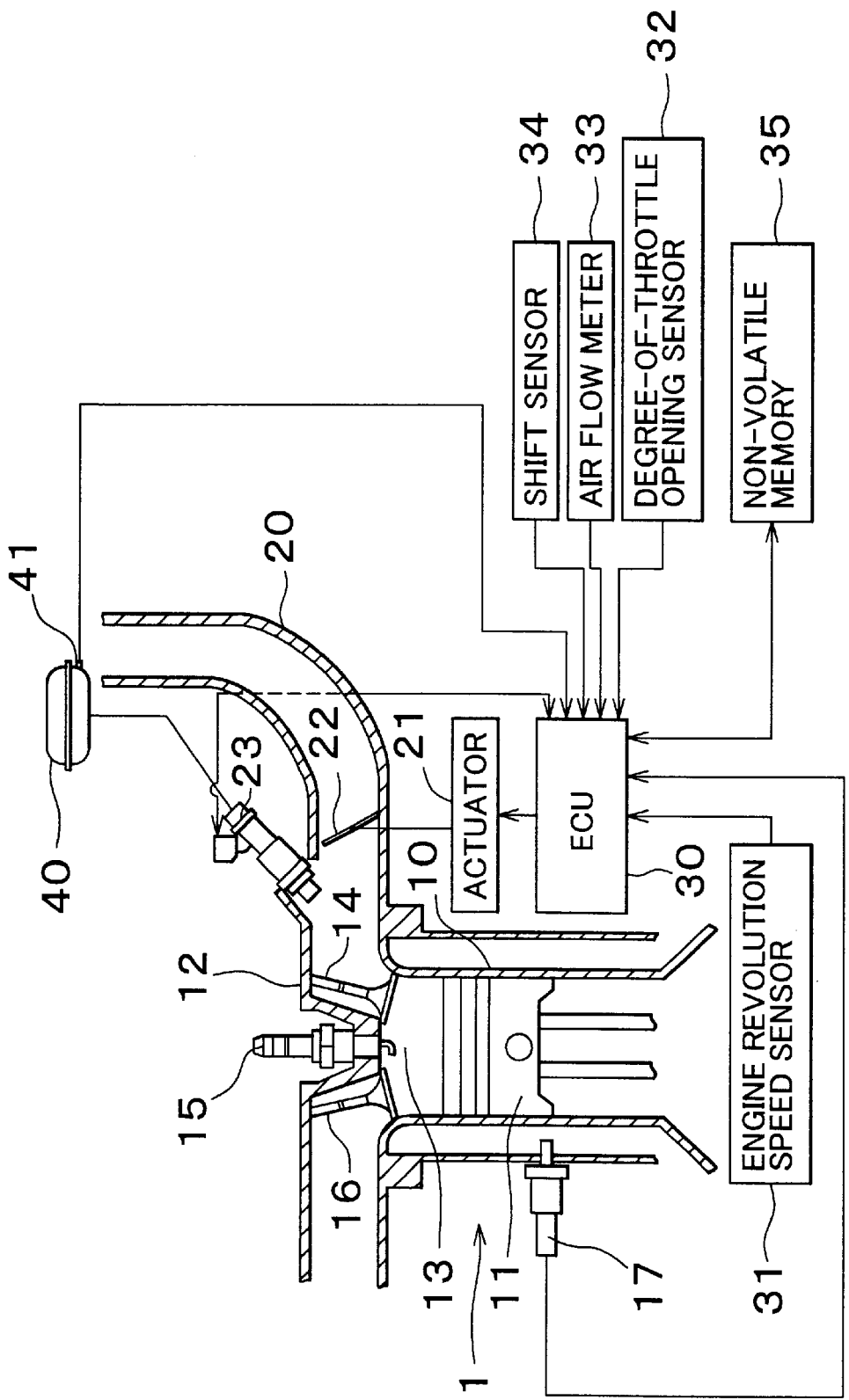
FIG. 1 is a schematic diagram illustrating a construction of an internal combustion engine equipped with an intake control apparatus in accordance with the claimed invention.

Preferred embodiments of the invention will be described hereinafter with reference to the accompanying drawings.

For the easier understanding of the description, the same component elements are represented by the same reference numerals in the drawings, and repeated descriptions of the same component elements will be avoided as much as possible.

FIG. 1 is a schematic diagram illustrating a construction of an internal combustion engine equipped with an internal combustion engine control apparatus in accordance with the invention. In an internal combustion engine 1, a piston 11 is disposed for movements in vertical directions in FIG. 1 within a cylinder 10. A combustion chamber 13 is formed within the cylinder 10 by a space defined between the piston 11 and a cylinder head 12. An intake valve 14, an ignition plug 15 and an exhaust valve 16 are mounted above the combustion chamber 13. A water temperature sensor 17 for measuring the water temperature of cooling water is disposed outside the cylinder 10.

An intake pipe 20 is connected to an intake port in which the intake valve 14 is disposed. An intake control valve 22 that is closed and opened by an actuator 21 is disposed in the intake valve 14 downstream of a throttle valve (not shown). Disposed further downstream is a fuel injection device (injector) 23 that sprays fuel into the intake pipe. The injector 23 is connected to a fuel tank 40 that is provided with a liquid level sensor 41 for detecting the amount of fuel present in the tank.

An ECU 30 that serves also as a control portion of the control apparatus of an internal combustion engine of the invention controls the actuator 21 and the injector 23, and accepts input of outputs of the water temperature sensor 17 as well as an engine revolution speed sensor 31, a degree-of-throttle opening sensor 32, an air flow meter 33, a shift sensor 34 and the liquid level sensor 41. The ECU 30 is connected to a non-volatile memory 35.

Figure 2:
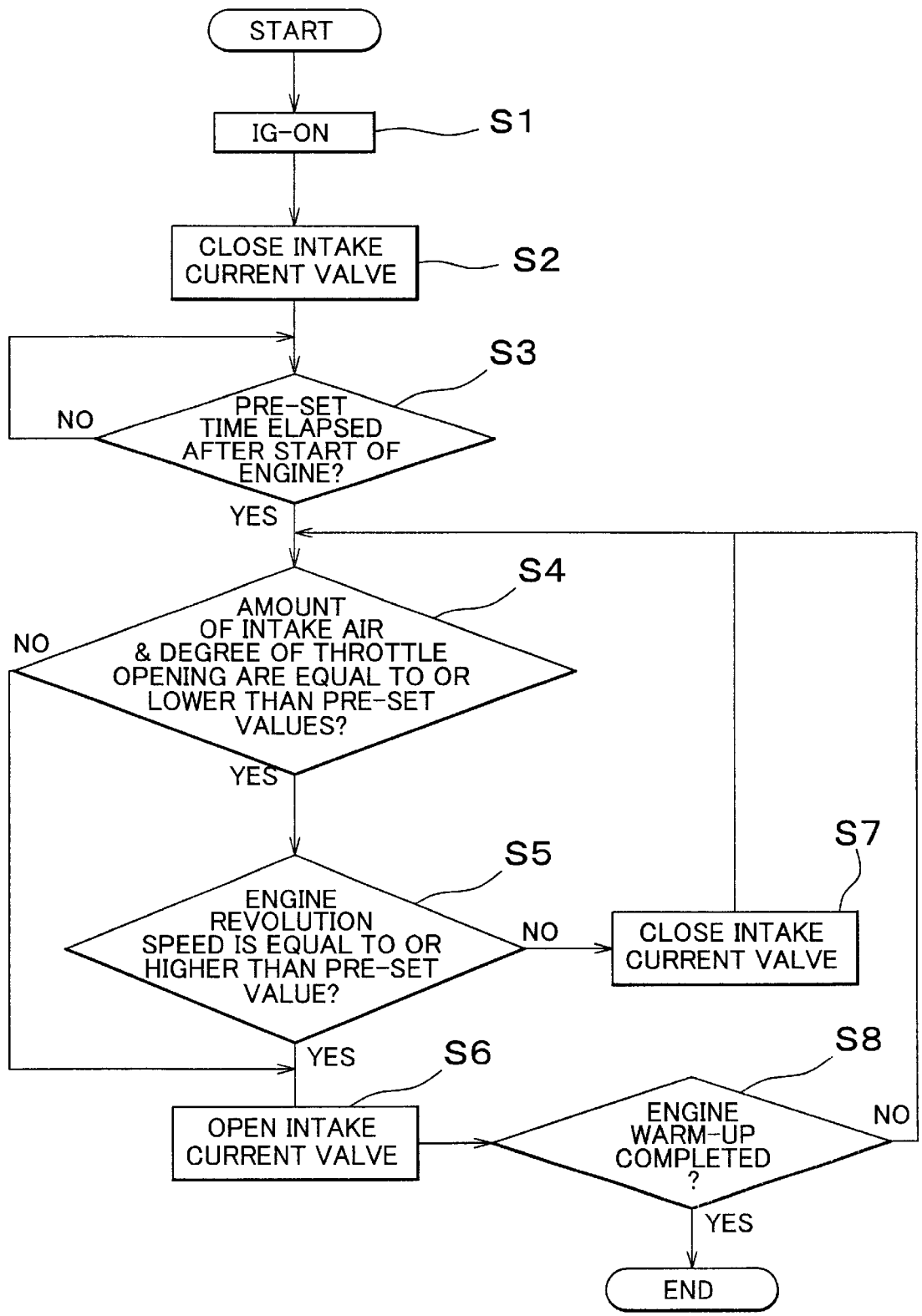
FIG. 2 is a flowchart illustrating a first exemplary process of controlling the intake control apparatus.
Figure 3A:
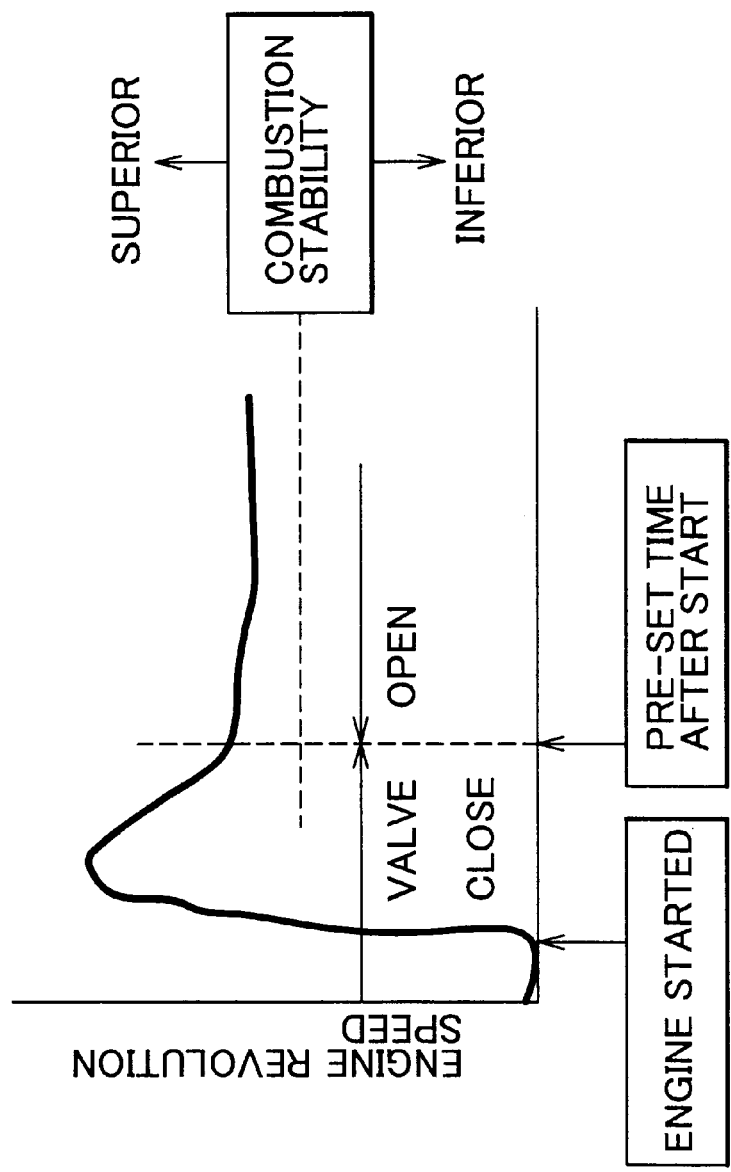
FIG. 3A is a diagram showing time-dependent changes in engine revolution speed caused by using normal fuel with the control process of FIG. 2.

A specific example of the control operation of the internal combustion engine control apparatus in accordance with the invention will be described below. FIG. 2 is a flowchart illustrating a first exemplary process of the controlling the apparatus. FIG. 3A shows time-dependent changes in engine revolution speed caused by using normal fuel with the control process. Furthermore, FIG. 3B shows time-dependent changes in engine revolution speed caused by using low-quality fuel with the control process. In the cases shown in FIGS. 3A and 3B, there are no other load change requests, such as an accelerator operation and the like. This control is executed by the ECU 30 only once during a cold start of the internal combustion engine.

First in step S1 in FIG. 2, the ignition switch is turned on. Subsequently, in step S2, the intake control valve 22 is closed by the actuator 21. Subsequently in step S3, a loop process is performed until the elapse of a predetermined time following the start of the engine. The closing of the intake control valve 22 constricts or reduces the area of passage in the intake pipe 20, and therefore increases the negative pressure downstream of the intake control valve 22, thereby promoting formation of smaller particles of fuel injected from the injector 23. Furthermore, the air current passing through the constricted portion is accelerated, so that a turbulence is caused within the combustion chamber 13, and therefore lean combustion is made possible. Thus, an improvement in combustion can be achieved. Therefore, it becomes possible to quickly increase the engine revolution speed and improve the start-up performance using both normal fuel and low-quality fuel, as indicated in FIGS. 3A and 3B.

After the predetermined time elapses, the process proceeds to step S4, where it is determined whether the amount of intake air determined from an output of the air flow meter 33 is less than or equal to a predetermined value, and the degree of throttle opening acquired from the degree-of-throttle opening sensor 32 is less than or equal to a predetermined value. If the result of determination is "NO", that is, if at least one of the amount of intake air and the degree of throttle opening is greater than or equal to the predetermined value, it is considered that there is an engine load increase request. Therefore, there is a need to increase the amount of air led to the combustion chamber 13, and the process proceeds to step S6. In step S6, the intake control valve 22 is opened through the use of the actuator 21 to eliminate the constricting effect and reduce the pumping loss so that the amount of air led to the combustion chamber 13 is increased (if the intake control valve 22 has already been opened, the open state thereof is maintained).

If the result of the determination in step S4 is "YES", the process proceeds to step S5, where it is determined whether the engine revolution speed detected by the engine revolution speed sensor 31 is greater than or equal to a predetermined value. This predetermined value is shown as a combustion stability in FIGS. 3A and 3B. If the result of determination in step S5 is "YES", the combustion is considered to be stable, and therefore there is no need to improve the combustion by closing the intake control valve 22. Next, the process proceeds to step S6. In step S6, the intake control valve 22 is opened through the use of the actuator 21 (if the intake current valve 22 has already been opened, the open state thereof is maintained). Conversely, if the result of determination in step S5 is "NO", the combustion is considered to be unstable, and therefore it is necessary to improve the combustion by closing the intake control valve 22. Next, the process proceeds to step S7. In step S7, the intake control valve 22 is closed by using the actuator 21 (if the intake control valve 22 has already been closed, the closed state thereof is maintained). Then, the process returns to step S4.

After the processing of step S6 is completed, the process proceeds to step S8, in which it is determined whether the engine warm-up has been completed based on the engine cooling water temperature. If it is determined that the engine warm-up has been completed, the controlling process is ended. Conversely, if it is determined that the engine warm-up has not been completed, the process returns to step S4 so as to continue the control process.

According to this control process, a sufficient combustion stability can be secured with normal fuel even if the intake control valve 22 is opened after the elapse of the predetermined time, as indicated in FIG. 3A. Therefore, under a condition where a sufficient combustion stability is obtained, the intake control valve is opened so that excessive combustion is avoided. Hence, this control process avoids an excessively increased combustion speed which would otherwise cause production of a great amount of Nox. Moreover, the control process also avoids an excessively early end of the combustion which would otherwise reduce the exhaust temperature during a later period of the combustion stroke so that the post-burn of unburned fuel during the exhaust stroke would be retarded, and therefore the amount of emission HC would increase. Thus, unwanted emissions can be further reduced.

With low-quality fuel that is poor in combustion performance, opening the intake control valve 22 prior to sufficient warm-up of the engine will degrade combustion so that low engine revolution speed will result. In this control process, however, if combustion deteriorates as described above, the intake control valve 22 is closed to improve combustion. Therefore, if a sufficient stability of combustion cannot be obtained, the combustion improvement is maintained so as to reduce the emission of unburned fuel caused by the deteriorated combustion. Furthermore, by maintaining combustion improvement, the control process substantially prevents degradation in the operation of the engine, thereby avoiding discomfort to an occupant of the vehicle.

Thus, after the elapse of a predetermined time following the startup of the engine, the combustion improvement is performed only where the state of combustion in the engine deteriorates. Therefore, it is possible to obtain both stabilization of the operation of the engine, and an improvement in emission. Since the operation of the engine is stabilized, the discomfort that an occupant feels upon fluctuations in the operation of the engine can be reduced.

Although in the above-described control process, the combustion stability criterion value (engine revolution speed) for closing the intake control valve 22 equals the combustion stability criterion value (engine revolution speed) for opening the intake control valve 22, an offset may be provided between the two values. For example, the combustion stability criterion value for opening the intake control valve 22 may be set greater the combustion stability criterion value for closing the intake control valve 22. Such setting will prevent frequent execution of the control of opening and closing the intake control valve 22.

Although in FIGS. 3A and 3B, the engine revolution speed adopted as the combustion stability criterion value is constant, the engine revolution speed adopted as the combustion stability criterion value may be varied in accordance with the engine cooling water temperature (as indicated in FIG. 4) because the required value of engine revolution speed that can provide stable combustion varies depending on the warm-up state of the engine. That is, when the engine cooling water temperature is high, stable combustion can be obtained even at lower engine revolution speeds.

Figure 6:
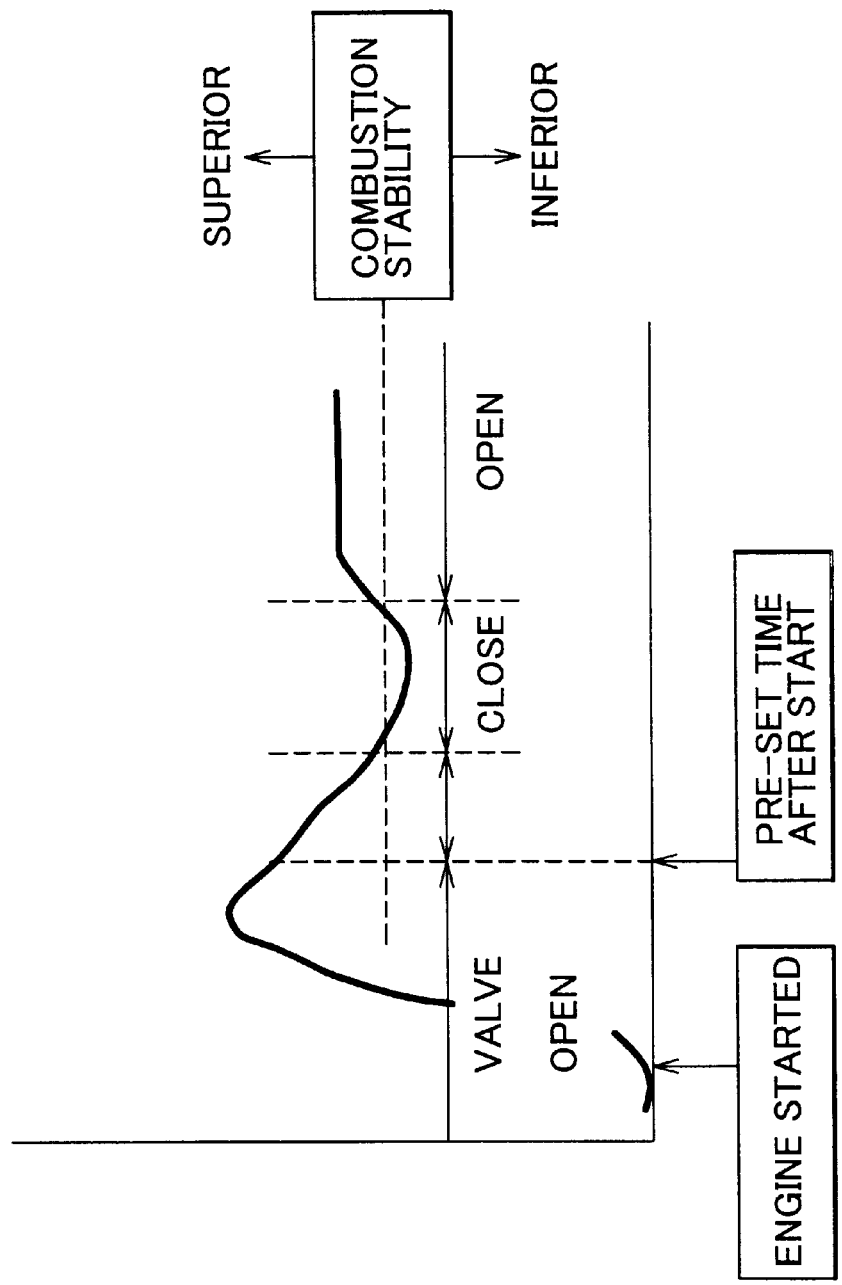
FIG. 6 is a diagram showing time-dependent changes in engine revolution speed caused by using low-quality fuel with the control process of FIG. 5.

FIG. 5 is a flowchart illustrating a second exemplary process of controlling the control apparatus. FIG. 6 shows a time-dependent change in engine revolution speed when using low-quality fuel based on the control process. In this case, there are no other load change requests, such as an accelerator operation or the like. This control process is executed by the ECU 30 only once during a cold start of the internal combustion engine as in the first example of the control process. Features of the second exemplary process of controlling the control apparatus differently from those of the first exemplary process will be described below.

Although in the first exemplary process, the intake control valve 22 is forcibly closed until the elapse of the predetermined time (steps S2 and S3), the second exemplary process of controlling the apparatus is performed with the intake control valve 22 opened from the beginning (step S2a).

In this control process, the intake control valve 22 is kept open from the time of startup of the engine despite a lack of the combustion improving effect if a good-quality fuel that allows stable combustion is used. Thus, an excessive combustion is avoided. That is, this control process avoids an excessively great combustion speed which would otherwise cause production of a great amount of Nox. This control process also avoids an excessively early end of combustion which would otherwise reduce the exhaust temperature during a later period of the combustion stroke so that the post-burn of unburned fuel during the exhaust stroke would be retarded thus increasing the amount of emission HC. Thus, unwanted emissions can be further reduced.

With a low-quality fuel that is poor in combustion performance, combustion will deteriorate and the engine revolution speed will reduce if a combustion improving effect is not provided. According to this control process, however, the intake control valve 22 is closed when it is determined that combustion has deteriorated. Thus, the combustion improvement is performed only when necessary. Therefore, this control process avoids deterioration of combustion, avoids degraded emission caused by emission of unburned fuel and an unstable operation of the engine.

Thus, this control process performs the combustion improvement only when the combustion in the engine deteriorates. Therefore, it is possible to obtain both stabilization of the operation of the engine, and improvement in emission. Furthermore, the discomfort that an occupant feels upon fluctuations in the operation of the engine can be reduced. According to the control process, an offset may be provided between the combustion stability criterion value (engine revolution speed) for closing the intake control valve 22, and the combustion stability criterion value (engine revolution speed) for opening the intake control valve 22, as in the first exemplary process.

Figure 7:
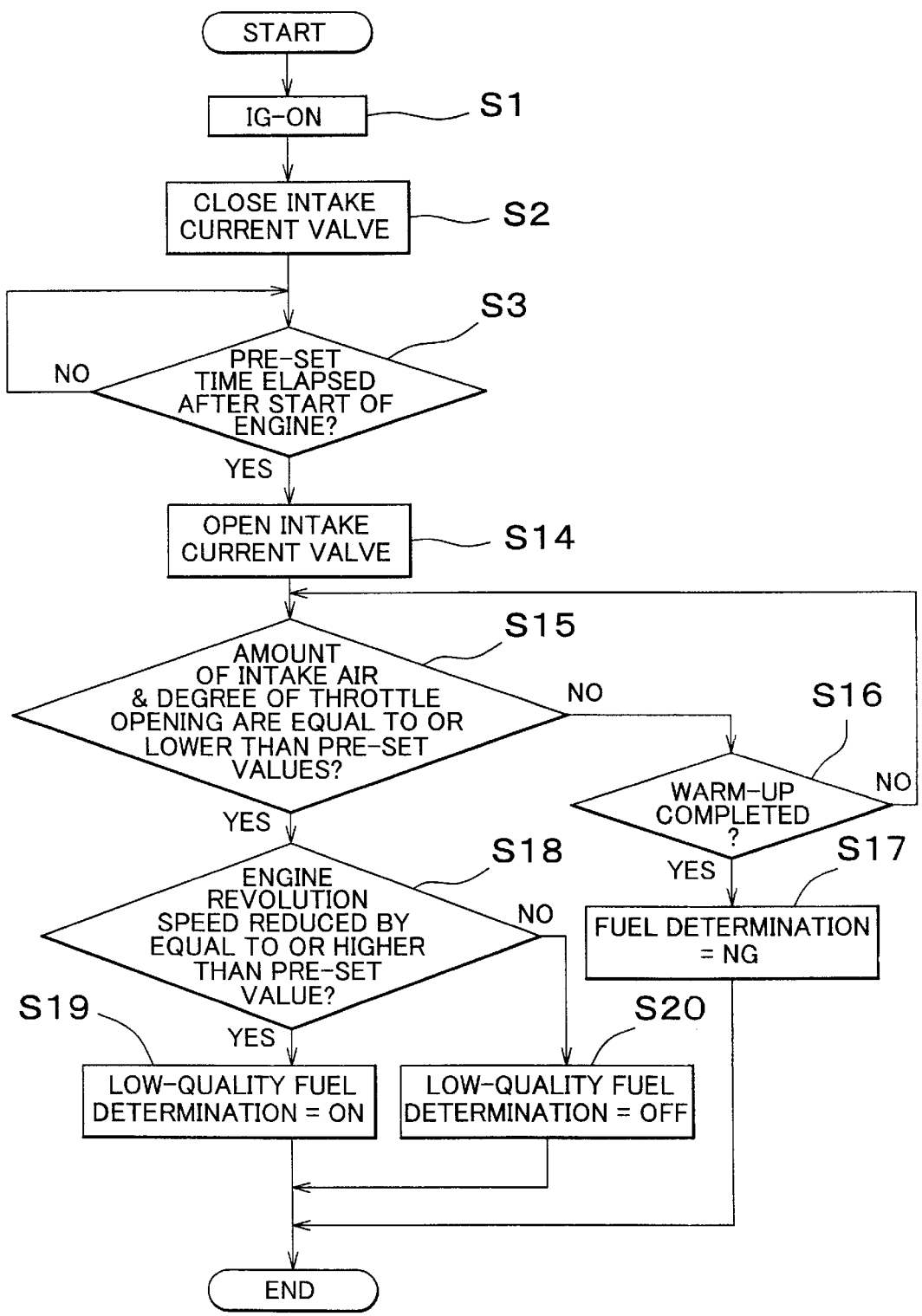
FIG. 7 is a flowchart illustrating a first exemplary process for determining a property of fuel.
Figure 8:
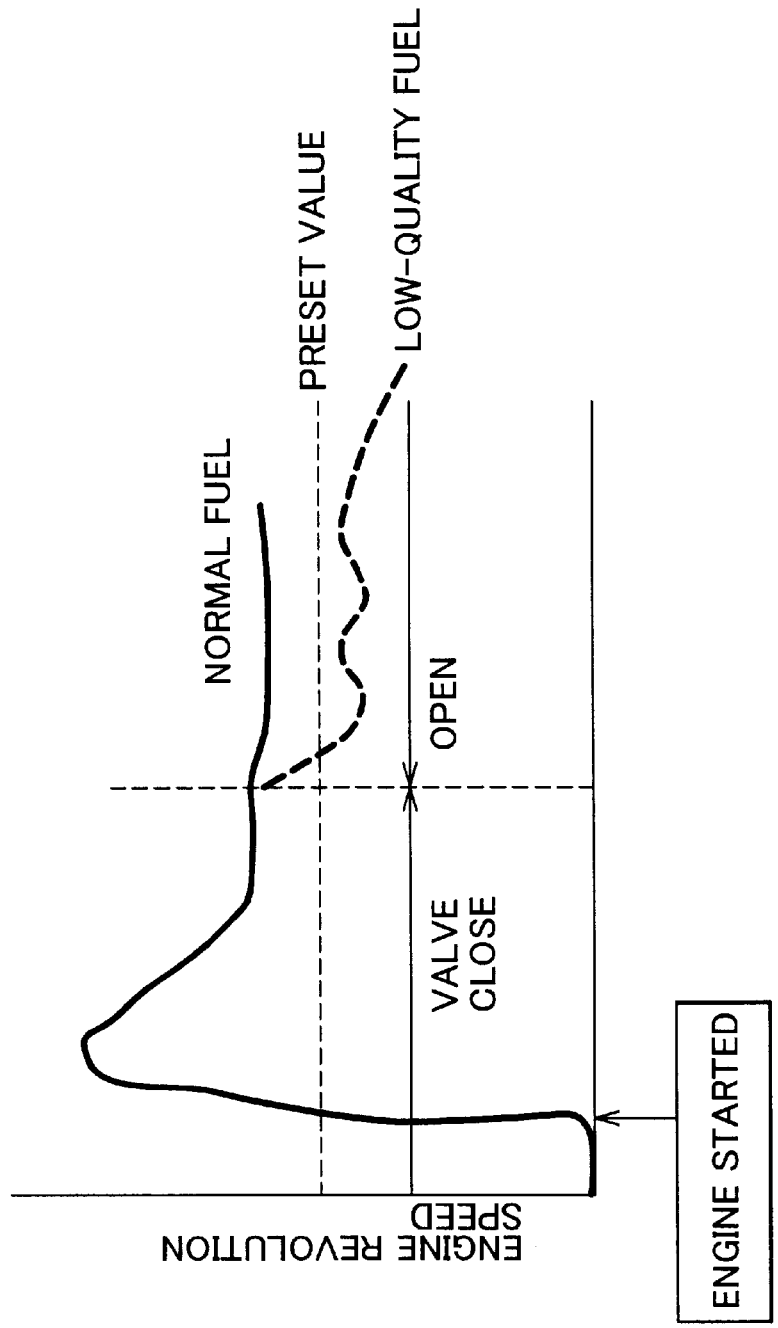
FIG. 8 is a diagram showing time-dependent changes in engine revolution speed based on the process of FIG. 7.

Two examples of determining the property of fuel based on changes in the combustion will be described. FIG. 7 is a flowchart illustrating a first exemplary process for determining the property of fuel. FIG. 8 shows time-dependent changes in engine revolution speed based on this control process. In FIG. 8, there are no other load change requests, such as an accelerator operation or the like. This control process is executed by the ECU 30 only once at the time of a cold start of the internal combustion engine, as shown in the first and second exemplary processes.

First, in step S1 in FIG. 7, the ignition switch is turned on. Subsequently, in step S2, the intake control valve 22 is closed by the actuator 21. Subsequently, in step S3, the loop process is performed until the elapse of a predetermined time following the start of the engine. The process up to this stage is the same as in the first exemplary process. The closing of the intake control valve 22 constricts or reduces the area of passage in the intake pipe 20, and therefore increases the negative pressure downstream of the intake control valve 22, which promotes formation of smaller particles of fuel injected from the injector 23. Furthermore, the air current passing through the constricted portion is accelerated, so that a turbulence is caused within the combustion chamber 13, and therefore lean combustion is made possible. Thus, an improvement in combustion can be achieved. Therefore, it becomes possible to quickly increase the engine revolution speed and improve the start-up performance using both normal fuel and a low-quality fuel, as shown in FIG. 8.

After the predetermined time elapses, the process proceeds to step S14, where the intake control valve 22 is opened by the actuator 21 so as to discontinue the combustion improvement. Subsequently, in step S15, it is determined whether the amount of intake determined from the output of the air flow meter 33 is less than or equal to a predetermined value, and whether the degree of throttle opening acquired from the degree-of-throttle opening sensor 32 is less than or equal to a predetermined value. If the result of determination is "NO", that is, if at least one of the amount of intake and the degree of throttle opening is greater than or equal to the predetermined value, it is considered that there is a request for an increased engine load and the amount of air led to the combustion chamber 13 is increasing. Therefore, a condition for performing the determination regarding the property of fuel is considered not met, so the process proceeds to step S16. In step S16, it is determined whether the warm-up of the engine has been completed based on the engine cooling water temperature. If it is determined that the warm-up has been completed, the process proceeds to step S17 in which a fuel determination flag is set to an NG status indicating that the fuel property determination was not possible. Next, the process of the control is ended. Conversely, if it is determined in step S16 that the warm-up has not been completed, the process returns to step S15 to continue the control process.

If the result of determination at step S15 is "YES", the control process proceeds to step S18, where it is determined whether the magnitude of reduction in engine revolution speed detected by the engine revolution speed sensor 31 is greater than or equal to a predetermined value. This determination is preferably performed after the elapse of a predetermined time following the opening operation of the intake control valve 22. In reality, therefore, it is preferable to perform a weighting process before step S18.

If the result of determination at step S18 is "YES", that is, if the engine revolution speed remarkably reduces (as indicated by a broken line in FIG. 8), the combustion is considered unstable and the fuel is considered a low-quality fuel. Next, the process proceeds to step S19, in which a low-quality fuel determination flag is set to an ON status. The process is then ended. Conversely, if the result of determination at step S18 is "NO", that is, if no remarkable reduction in engine revolution speed is exhibited (as indicated by a solid line in FIG. 8), the combustion is considered stable and the fuel is considered a normal fuel. Next, the process proceeds to step S20, in which the low-quality fuel determination flag is set to an OFF status. Then, the process is ended.

According to this determination process, it is possible to determine the property of fuel based on changes in the operation of the internal combustion engine 1 (state of combustion, more specifically, engine revolution speed) that occur during the close→open control of the intake control valve 22 following the start of the engine.

Figure 9:
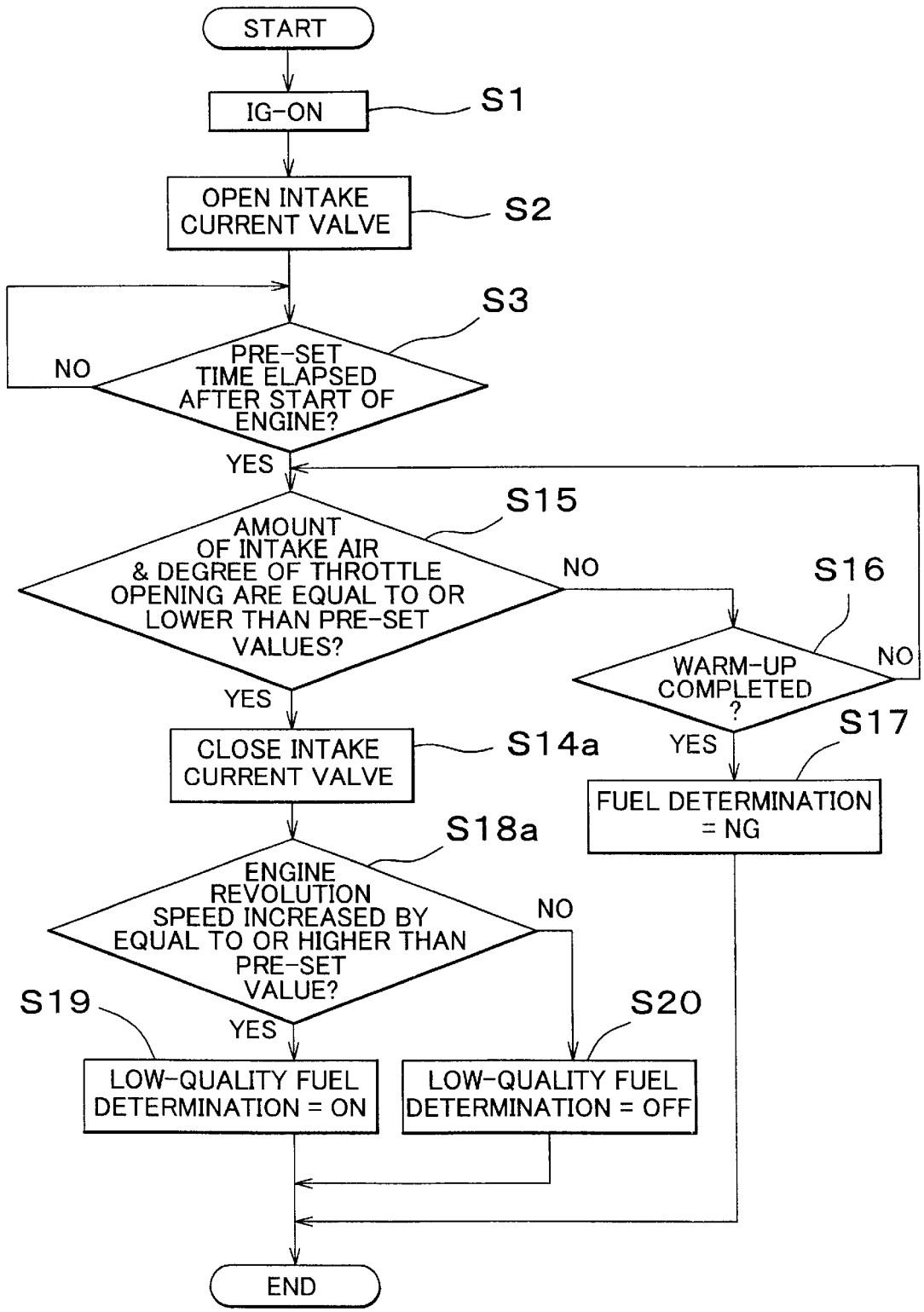
FIG. 9 is a flowchart illustrating a second exemplary process for determining the property of the fuel.
Figure 10:
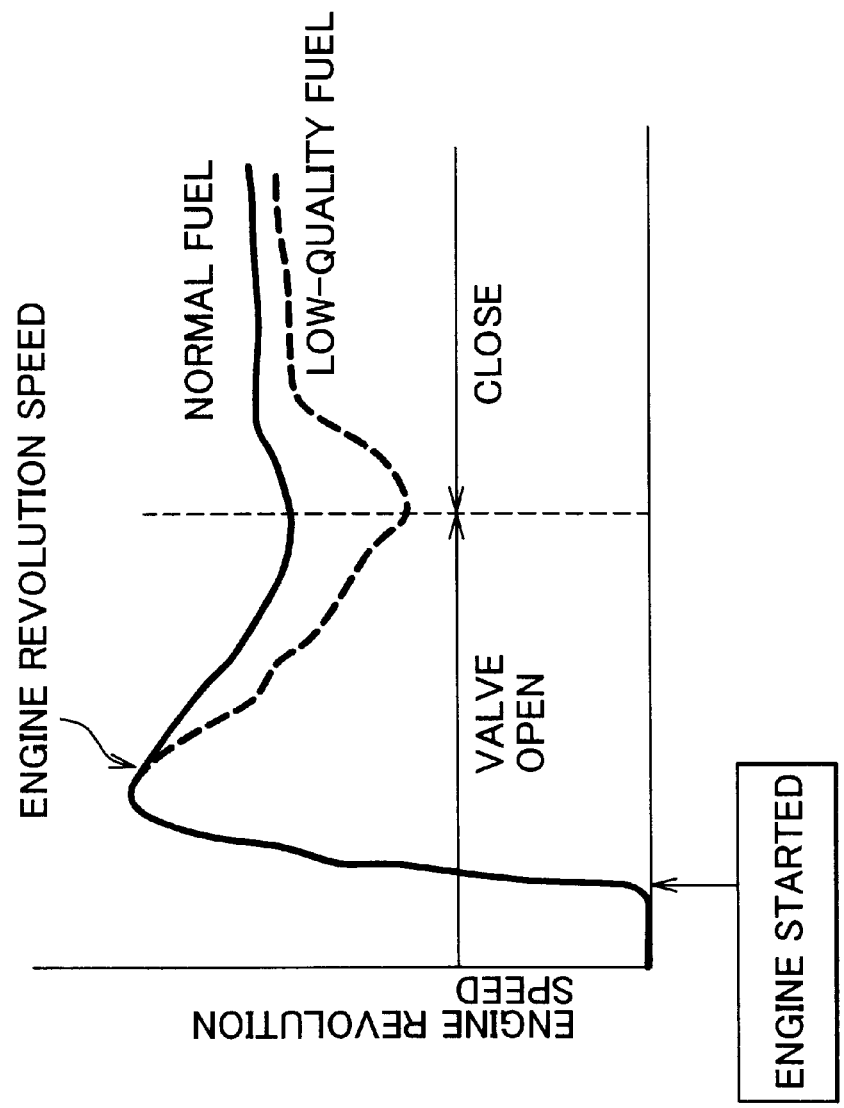
FIG. 10 is a diagram showing time-dependent changes in engine revolution speed based on the process of FIG. 9.

FIG. 9 is a flowchart illustrating a second exemplary process for determining the property of fuel. FIG. 10 shows time-dependent changes in engine revolution speed based on the control process. As shown in FIG. 10, there are no other load change requests, such as an accelerator operation and the like. This control is executed by the ECU 30 only once at the time of a cold start of the internal combustion engine as in the first determining method.

First, in step S1 in FIG. 9, the ignition switch is turned on. Subsequently in step S2a, the intake control valve 22 is opened by the actuator 21. Subsequently, in step S3, the loop process is performed until the elapse of a predetermined time following the start of the engine. This process is the same as in the second exemplary process. As shown in FIG. 10, the engine revolution speed increases due to the starter motor. Then, after the spontaneous drive of the internal combustion engine 1 starts, the engine revolution speed reduces. The reduction in engine revolution speed is greater with a low-quality fuel (as indicated by a broken line) than with a normal fuel (as indicated by a solid line).

After the predetermined time elapses, the process proceeds to step S15, where it is determined whether the amount of intake determined from the output of the air flow meter 33 is less than or equal to a predetermined value, and the degree of throttle opening acquired from the degree-of-throttle opening sensor 32 is less than or equal to a predetermined value. If the result of determination is "NO", that is, if at least one of the amount of intake and the degree of throttle opening is greater than or equal to the predetermined value, a request for an increase in engine load is considered to have occurred, and the amount of air led to the combustion chamber 13 is considered to be increasing. Therefore, a condition for performing the determination regarding the property of fuel is considered not met, and the process proceeds to step S16. In step S16, it is determined whether the warm-up of the engine has been completed based on the engine cooling water temperature. If it is determined that the warm-up has been completed, the process proceeds to step S17, in which a fuel determination flag is set to an NG status indicating that the fuel property determination was not possible. Then, the process of the control is ended. Conversely, if it is determined in step S16 that the warm-up has not been completed, the process returns to step S15 to continue the control process.

In step S14a, following the affirmative determination at step S15, the intake control valve 22 is closed by the actuator 21 so as to forcibly perform the combustion improvement. Subsequently, in step S18a, it is determined whether the magnitude of increase in engine revolution speed caused by the combustion improvement, which is detected by the engine revolution speed sensor 31, is greater than or equal to a predetermined value. This determination is preferably performed based on the difference between the engine revolution speed occurring at the time of closure of the intake control valve 22 and the engine revolution speed occurring at or after the elapse of a predetermined time following the closure of the valve.

If the result of determination at step S18a is "YES", that is, if the engine revolution speed is remarkably increased by the combustion improvement (as indicated by a broken line in FIG. 10), the combustion prior to the combustion improvement is considered unstable, and the fuel is considered a low-quality fuel. Then, the process proceeds to step S19, in which a low-quality fuel determination flag is set to an ON status. The process is then ended. Conversely, if the result of determination at step S18a is "NO", that is, if no remarkable increase in engine revolution speed is caused by the combustion improvement (as indicated by a solid line in FIG. 10), the combustion is considered stable even before the combustion improvement, and the fuel is considered a normal fuel. Then, the process proceeds to step S20, in which the low-quality fuel determination flag is set to an OFF status. Then, the process is ended.

According to this determination process, it is possible to determine the property of fuel based on changes in the operation of the internal combustion engine 1 (state of combustion, more specifically, engine revolution speed) that occur during the control of the intake control valve 22 following the start of the engine.

Figure 11:
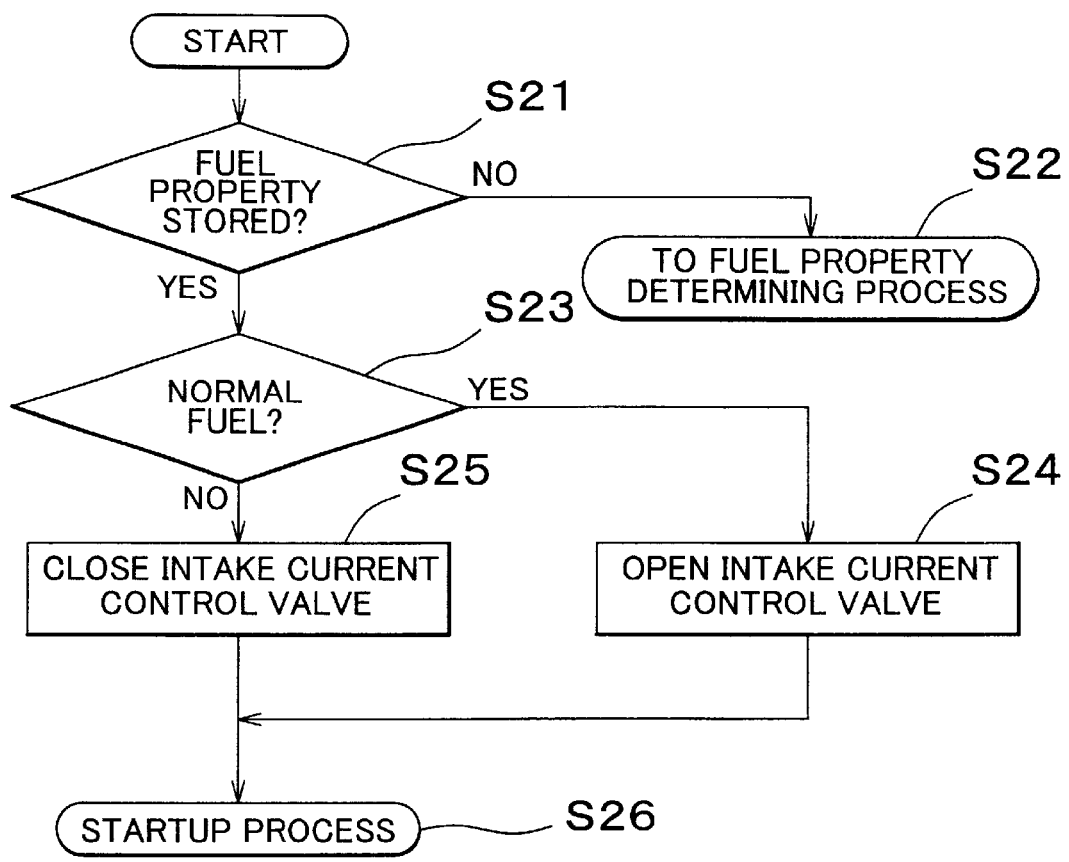
FIG. 11 is a flowchart illustrating a third exemplary process of controlling the intake control apparatus.

FIG. 11 is a flowchart illustrating a third exemplary process of controlling the control apparatus. This control process is characterized by using results of the determination provided by the first and second exemplary processes of determining the property of fuel. This control process is executed by the ECU 30 only once at the time of a cold start of the internal combustion engine, as is the case with the first and second exemplary control processes.

First, in step S12, it is determined whether the present property of fuel has already been stored in the non-volatile memory 35. If refueling was performed after the previous cycle of the fuel determination process, it is preferable to reset the value stored in the non-volatile memory 35 regarding the property of fuel. Determination as to whether fuel was supplied after the previous cycle of the fuel determination process can be accomplished based on, for example, the output of the liquid level sensor 41.

If the property of fuel has not been stored, the process proceeds to step S22, where the process of determining the property of fuel is started. Conversely, if the property of fuel has been stored, the process proceeds to step S23, where it is determined whether the property of fuel stored in the non-volatile memory 35 indicates a normal fuel or a low-quality fuel.

If the stored property of fuel indicates a normal fuel, there is no need for the combustion improvement. Then, the process proceeds to step S24, in which the intake control valve 22 is opened by the actuator 21. The process then proceeds to step S26 for an engine startup process. Conversely, if the property of fuel indicates a low-quality fuel, the combustion improvement is needed. Then, the process proceeds to step S25, in which the intake control valve 22 is closed by the actuator 21. The process then proceeds to step S26 for the engine startup process.

Thus, by learning the property of fuel and using the learned value in the control of the intake control valve 22 at the time of starting the engine, the internal combustion engine can be warmed up while a stable state of combustion is maintained. Therefore, emission of unburned fuel can be reduced, and degradation of the operation of the engine can be reduced. Hence, discomfort that a vehicle occupant feels upon fluctuations of the state of operation of the engine can be reduced.

Figure 12:
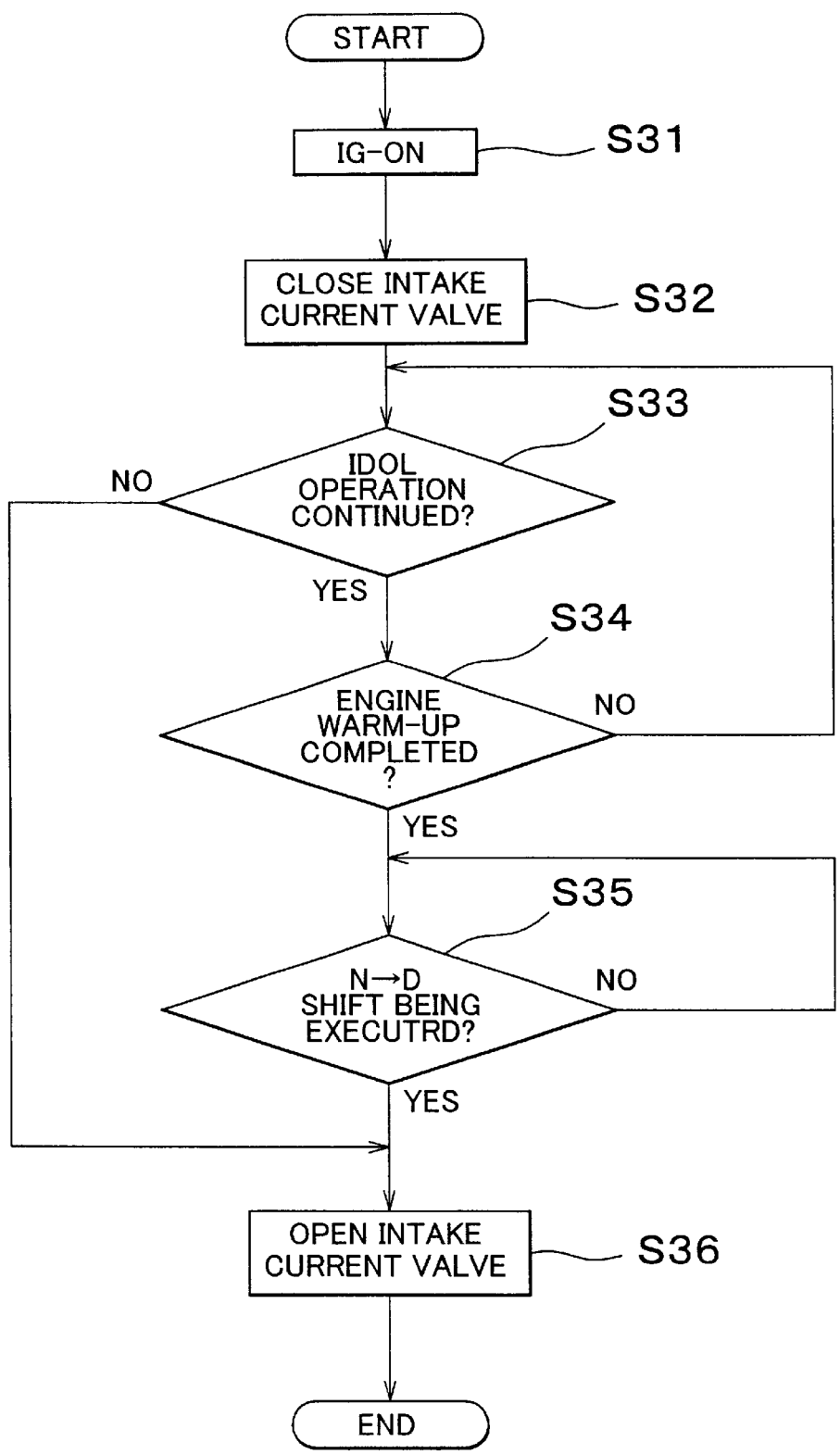
FIG. 12 is a flowchart illustrating a fourth exemplary process of controlling the intake control apparatus.
Figure 13B:
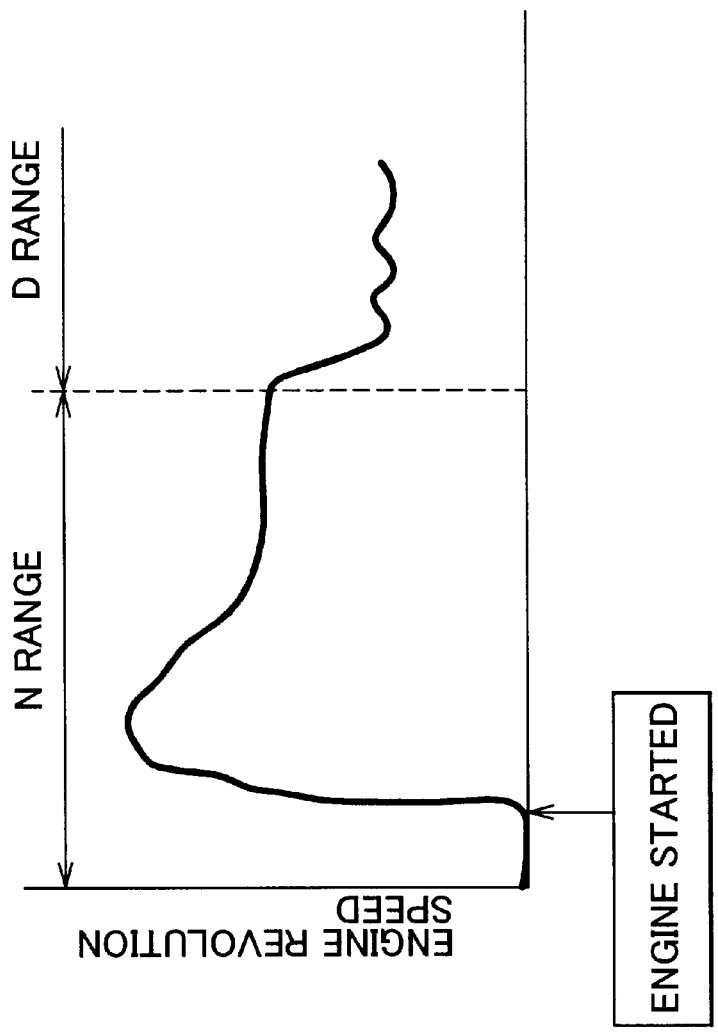
FIG. 13B is a graph showing changes in engine revolution speed that occur due to a shift operation.

FIG. 12 is a flowchart illustrating a fourth exemplary process of controlling the control apparatus. FIG. 13A shows time-dependent changes in engine revolution speed that occur in association with a control of opening and closing the intake control valve. FIG. 13B indicates time-dependent changes in engine revolution speed that occur in association with a shift in a transmission apparatus. This control process is executed by the ECU 30 only once at the time of a cold start of the internal combustion engine, as is the case with the first to third exemplary processes.

First, in step S31, the ignition key is turned on. Subsequently, in step S32, the intake control valve 22 is closed by the actuator 21. Then in step S33, it is determined whether the idling operation is being continued. If the idling operation is being continued, the process proceeds to step S34, where it is determined whether the warm-up of the engine has been completed. If it is determined that the warm-up has not been completed, the process returns to step S33. This loop process is repeated until the warm-up is completed, or until an operation of increasing the engine revolution speed is performed.

If it is determined in step S34 that the warm-up has been completed, the process proceeds to step S35. Step S35 is repeatedly performed until it is determined that the shift mode is changed to a drive mode by monitoring the output of the shift sensor 34. If the shift mode is changed to the drive mode, or if an operation of increasing the engine revolution speed from the idling state is performed, the process proceeds to step S36, where the intake control valve 22 is opened.

If the intake control valve 22 is changed from the closed state to the open state while the shift mode is held in the N range, the engine revolution speed falls in a short time, as indicated in FIG. 13A. Furthermore, at the time of a change in the shift mode alone, the engine revolution speed also drops as indicated in FIG. 13B. The changes in engine revolution speed in the latter case are anticipatable by a driver or an occupant. Therefore, as the change of the intake control valve 22 to the open state is synchronized with a change in the shift mode or the like in this control process, the event that a driver or an occupant feels discomfort at the time of a change in engine revolution speed can be prevented.

Although the foregoing description is made in conjunction with an example where the change of the intake control valve 22 is synchronized with a change in the shift mode or the like, the opening operation of the intake control valve 22 may be performed in accordance with a load change that allows a driver and an occupant to anticipate a change in engine revolution speed, for example, a load change in association with the driving of an air conditioner or the like. Furthermore, although the foregoing description is made in conjunction with the control process during the idling operation of the engine, the invention can be applied not only to the idling operation but also to cases where a combustion improving effect by the intake control valve can be expected, for example, a low-load operation or the like.

However, a most remarkable advantage can be expected in the application to the idling operation of the engine.

Thus, according to the exemplary embodiments of the invention, excessive combustion improvement is restricted and necessary combustion improvement is accomplished by controlling the opening and closing of the intake control valve in accordance with the stability of combustion. Therefore, both improvement in the startup performance of the engine, and reduction in emission can be achieved.

Furthermore, the property of fuel can be determined based on a change in the combustion that is caused by the opening or closing operation of the intake control valve.

Still further, if the opening and closing operation of the intake control valve is synchronized with fluctuations in load, events that an occupant is annoyed by a change in the operation of the engine in association with the opening or closing of the intake control valve can be prevented.

In the illustrated embodiments, the controller is implemented with a general purpose processor. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An intake control apparatus of an internal combustion engine, comprising:
   an intake control valve disposed in an intake pipe downstream of a throttle valve; and
   a controller that controls an opening and closing of the intake control valve based on a stability of combustion in the internal combustion engine, determined when a degree of a throttle opening is less than or equal to a predetermined value, from a start-up to a warm-up of the internal combustion engine.

2. The intake control apparatus according to claim 1, wherein the controller closes the intake control valve when the internal combustion engine is started, and opens the intake control valve if the stability of the combustion is equal to or higher than a predetermined stability.

3. The intake control apparatus according to claim 2, wherein the controller uses an engine revolution speed representing the stability of combustion, and changes a predetermined revolution speed as the predetermined stability based on an engine cooling water temperature.

4. The intake control apparatus according to claim 1, wherein the controller opens the intake control valve when the internal combustion engine is started-up, and closes the intake control valve if the stability of the combustion is equal to or lower than a predetermined stability.

5. The intake control apparatus according to claim 4, wherein the controller uses an engine revolution speed representing the stability of the combustion, and changes an engine revolution speed as the predetermined stability based on an engine cooling water temperature.

6. An intake control apparatus of an internal combustion engine, comprising:
   an intake control valve disposed in an intake pipe downstream of a throttle valve; and
   a controller that
   1) controls an opening and closing of the intake control valve based on a stability of combustion in the internal combustion engine, if there is no request for an increased load on the internal combustion engine, and
   2) opens the intake control valve regardless of the stability of the combustion, if there is a request for an increased load on the internal combustion engine.

7. An intake control method of an internal combustion engine that includes an intake control valve disposed in an intake pipe downstream of a throttle valve, comprising:
   determining a stability of a combustion in the internal combustion engine, when a degree of a throttle opening is less than or equal to a predetermined value, and
   controlling an opening and closing of the intake control valve based on the stability of the combustion in the internal combustion engine from a start-up to a warm-up of the internal combustion engine.

* * * * *